(12) United States Patent
Hauss

(10) Patent No.: US 6,276,732 B1
(45) Date of Patent: Aug. 21, 2001

(54) LIFTING DEVICE

(75) Inventor: Michael Hauss, Waterloo (CA)

(73) Assignee: Omni-Lift U.S.A., Kitchener (CA)

( * ) Notice: Subject to any disclaimer, the term of this patent is extended or adjusted under 35 U.S.C. 154(b) by 0 days.

(21) Appl. No.: 09/488,004

(22) Filed: Jan. 20, 2000

(51) Int. Cl.⁷ ................................................. B65G 7/12
(52) U.S. Cl. ............................................. 294/16; 294/118
(58) Field of Search ................................. 294/15–17, 90, 294/113, 117, 118, 902

(56) References Cited

U.S. PATENT DOCUMENTS

| | | | | |
|---|---|---|---|---|
| 311,478 | * | 2/1885 | Flansburgh | 294/16 |
| 796,642 | * | 8/1905 | Hall | 294/16 |
| 1,465,892 | * | 8/1923 | Burgess | 294/16 |
| 1,987,493 | * | 1/1935 | Richards | 294/16 |
| 2,367,889 | * | 1/1945 | Radtke | 294/16 |
| 2,526,085 | * | 10/1950 | Rotollo | 294/118 |
| 2,819,111 | * | 1/1958 | Cozzens | 294/16 X |
| 3,572,808 | * | 3/1971 | Miller | 294/118 |
| 4,572,566 | * | 2/1986 | Terrington | 294/16 X |
| 4,929,010 | * | 5/1990 | Lahti | 294/16 |
| 5,009,558 | * | 4/1991 | Savedra | 294/16 X |

\* cited by examiner

*Primary Examiner*—Johnny D. Cherry
(74) *Attorney, Agent, or Firm*—Marks & Clerk

(57) ABSTRACT

A lifting device for use in lifting round, square and rectangular objects such as manhole covers and castings and maintenance and road drains as well as irregularly shaped objects. The device includes pivotally connected arms operating in an opposed lever fashion. The upper end of each arm has a handle with hand grips for use by a pair of operators each standing on an opposite side of the object to be lifted. Gripping pads are articulated to the lower end of each arm such that lifting on the hand grips causes the gripping pads to be forced towards each other thereby clamping onto the object to be lifted. Increasing the lifting force increases the clamping force. The upper arms may alternatively or also include a hook or eye member for attachment to a cable or the like when an object is too heavy to be lifted by two operators. In this case a crane or boom truck is used to raise and move the object.

11 Claims, 2 Drawing Sheets

LIFTING DEVICE

FIELD OF THE INVENTION

This invention relates to lifting devices and, more particularly, to devices for lifting and moving relatively heavy objects having both regular and irregular shapes.

BACKGROUND

One of the most common injuries sustained by construction workers, maintenance crews and those engaged in similar work involves the back due to stresses placed on it by lifting and carrying heavy and awkward objects. Injuries to the hands and feet are also relatively common as workers are frequently required to lift and move heavy objects which do not have proper handles and consequently are difficult to grasp. Objects of this category include but are not limited to maintenance hole covers, catch basin covers and their respective frames.

Numerous existing lifting devices utilize pincers or friction pads with the opposinglever concept in their application to convey a specific item such as masonry, meat and logs. In this regard, the prior art is replete with patents relating to devices and methods designed to assist in the lifting and moving of objects.

Some examples of these prior patents include recently issued U.S. Pat. No. 5,713,559, dated Feb. 3, 1998, to McClarin, et al that describes a device intended to raise fence posts and to lift certain objects including manhole covers. This patent discloses a first-class lever system in which a hook, at one end of an elongate arm, is attached to a manhole cover that in turn is raised by forcing downwardly the distal end of the arm. The fulcrum of the lever is located close to the end to which the manhole cover is connected. This device provides a lifting system, but is not readily adaptable to moving and subsequently positioning the manhole cover. U.S. Pat. No. 5,791,855, which issued Aug. 11, 1998, to Dixon, and U.S. Pat. No. 5,848,668, which issued Dec. 15, 1998, to Kafrissen, both relate to arrangements having a frame with wheels and means to raise and carry objects by first raising the object to a sufficient height to allow the carrying device to slide underneath. In other words, some lifting by the user is required before the device can be used.

In spite of the previous efforts to design an effective lifting device, there remains a need for a convenient and safe means of lifting relatively heavy objects while safeguarding the users from back and/or leg and feet injuries.

SUMMARY OF THE INVENTION

It is, accordingly, an object of the present invention to provide a lifting device for safely lifting heavy, regular and odd shaped, objects.

It is also an object of the present invention to provide a lifting device that can be used to conveniently move objects from one point to another after they has been lifted.

It is a still further object of the present invention to provide a lifting device that can be used by two individuals to raise and lower heavy objects with minimum strain and effort.

It is also an object of the present invention to provide a lifting device that can be operated with cables and hooks using boom trucks, backhoes, etc.to lift objects that are too heavy to be lifted by two individuals.

Therefore, in accordance with a first aspect of the present invention there is provided a lifting device comprising a pair of elongated arms pivotally connected to provide a pair of upper ends and a pair of cooperating lower ends; lifting means on each upper end for use in raising the lifting device; and gripping means on each lower end for gripping an object to be lifted; wherein an upward force on the lifting means causes the gripping means to be forced inwardly thereby clamping the object to be lifted.

In accordance with the preferred embodiment of this aspect of the invention, the gripping means include a pair of articulated plate members attached to the lower end of the elongated arms. Preferably, the plate members include a central arcuate portion that may be coating with a rubberized material.

In accordance with a second aspect of the present invention there is provided a method of lifting objects comprising: providing a lifting device having a pair of elongated arm members pivotally connected to form a pair of spaced upper ends and a pair of cooperating lower ends, the upper ends having raising means and the lower ends having gripping means; placing the lifting device over the object such that the gripping means lie on opposite sides of the object; and applying upward movement to the raising means thereby clamping the gripping means to the object and lifting the same.

BRIEF DESCRIPTION OF THE DRAWINGS

The invention will now be described in greater detail with reference to the attached drawings wherein.

DETAILED DESCRIPTION OF THE INVENTION

Figure 1:
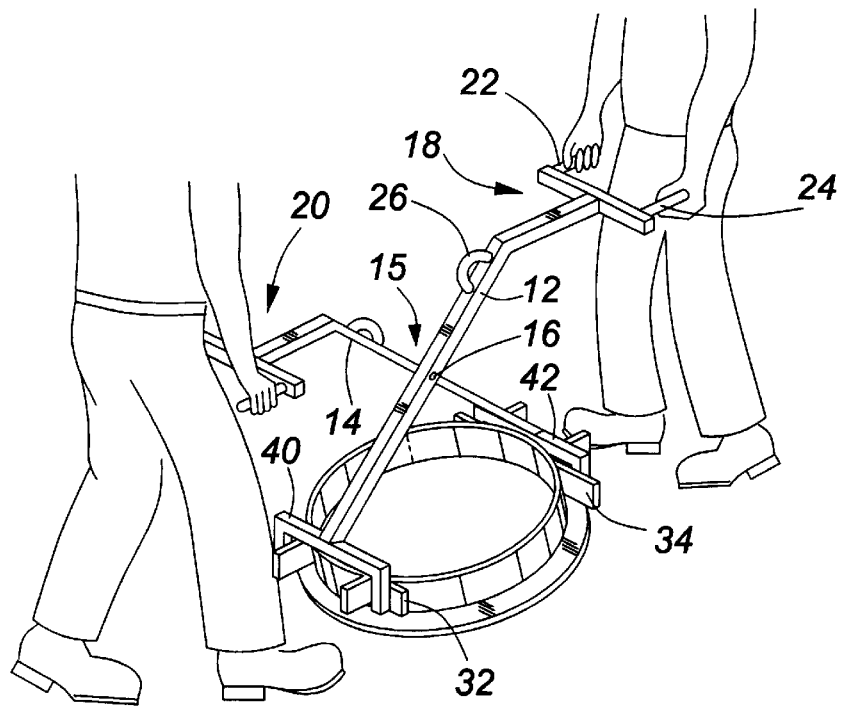
FIG. 1 is a perspective view of the lifting device of the present invention being used to raise a circular object.
Figure 2:
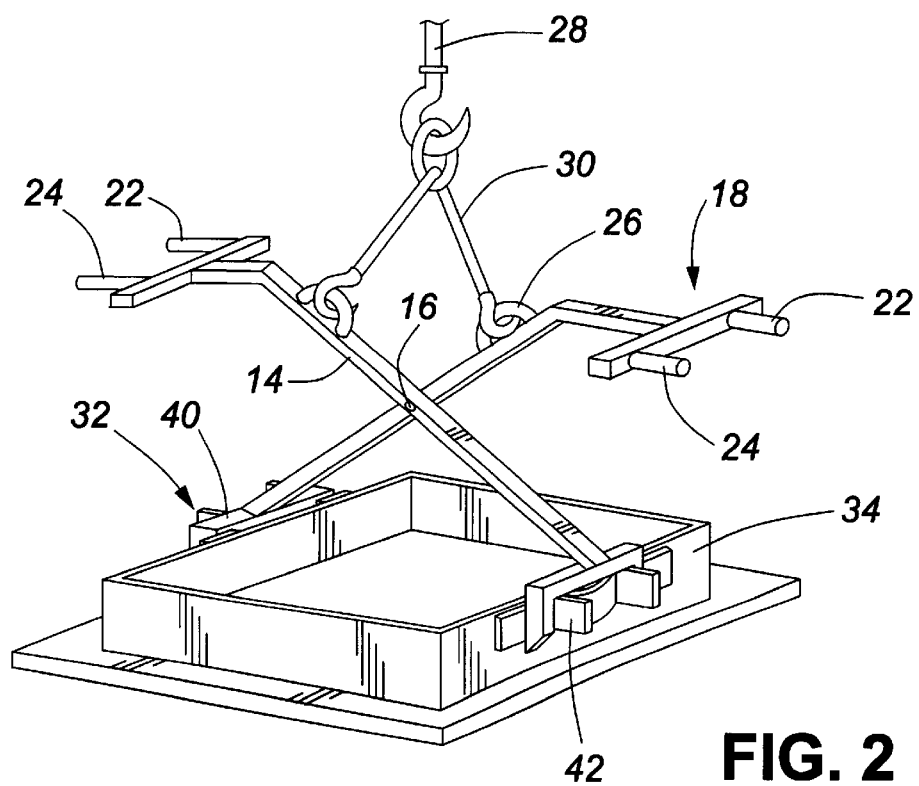
FIG. 2 is a perspective view of the device of the invention used to lift a rectangular object employing a mechanical lifting means such as a crane.

As best seen in FIGS. 1 and 2, the lifting device of the present invention comprises two arm members 12 and 14, pivotally connected by a pivot pin 16 at cross over point 15. Pin 16 can be a bolt and nut combination or a bolt and cotter pin, or C-clip as is well known in the art. In a preferred embodiment, the upper ends of arms 12 and 14 slant away from the longitudinal axis of the arm members so as to lie substantially parallel to the working surface when in use as shown in FIG. 1.

In the embodiment shown in FIG. 1, the upper end of each arm 12 and 14, includes handle members 18 and 20, respectively. Each handle member 18, 20 preferably has a pair of spaced apart handles 22, 24 for use by operators standing on opposite sides of the device as shown in FIG. 1. The handles can additionally include handgrips made of material such as molded vinyl.

As shown in FIGS. 1 and 2, arms 12 and 14 may also be provided with a loop or eye member 26 at or near the upper end. The eye members are used to connect a link cable 30 in order to raise the lifting device by mechanical means such as a crane or the like (not shown) using a cable 28. It will be apparent to one skilled in the art that if the lifting device is to be used exclusively with a mechanical lifting means, the handle members 18, 20 need not be provided. Conversely, if the device is for manual use only, the eye members 26 need not be included.

The lower end of each arm 12, 14 is provided with gripping means in the form of gripping pads or plate members 32, 34 respectively to be described later.

The operation of lifting or raising the device by the upper portion of the arms 12 and 14, whether manually as shown in FIG. 1, or mechanically as shown in FIG. 2, causes the gripping pads 32, 34 to be forced inwardly thereby gripping the objects to be raised. As discussed previously, the object may be a manhole cover or a manhole frame as shown in FIG. 1, or a catch basin, maintenance drain or road drain frame as shown in FIG. 2. It will be apparent to one skilled in the art that the operation of this lifting device lends itself to multiple additional uses including but not limited to pallets of bricks, concrete slabs, frames of many kinds, tombstones, barrels, 45 gallon drums, etc.

In a preferred embodiment, the lower end of each arm 12, 14 has secured thereto a fork member 40, 42 respectively, to which the gripping pads 32, 34 are attached. As shown in FIGS. 1 and 2, the gripping pads 32, 34 are preferably attached to fork members 40, 42 in a manner which allows the pads to pivot or rotate with respect to the forks.

Figure 3:
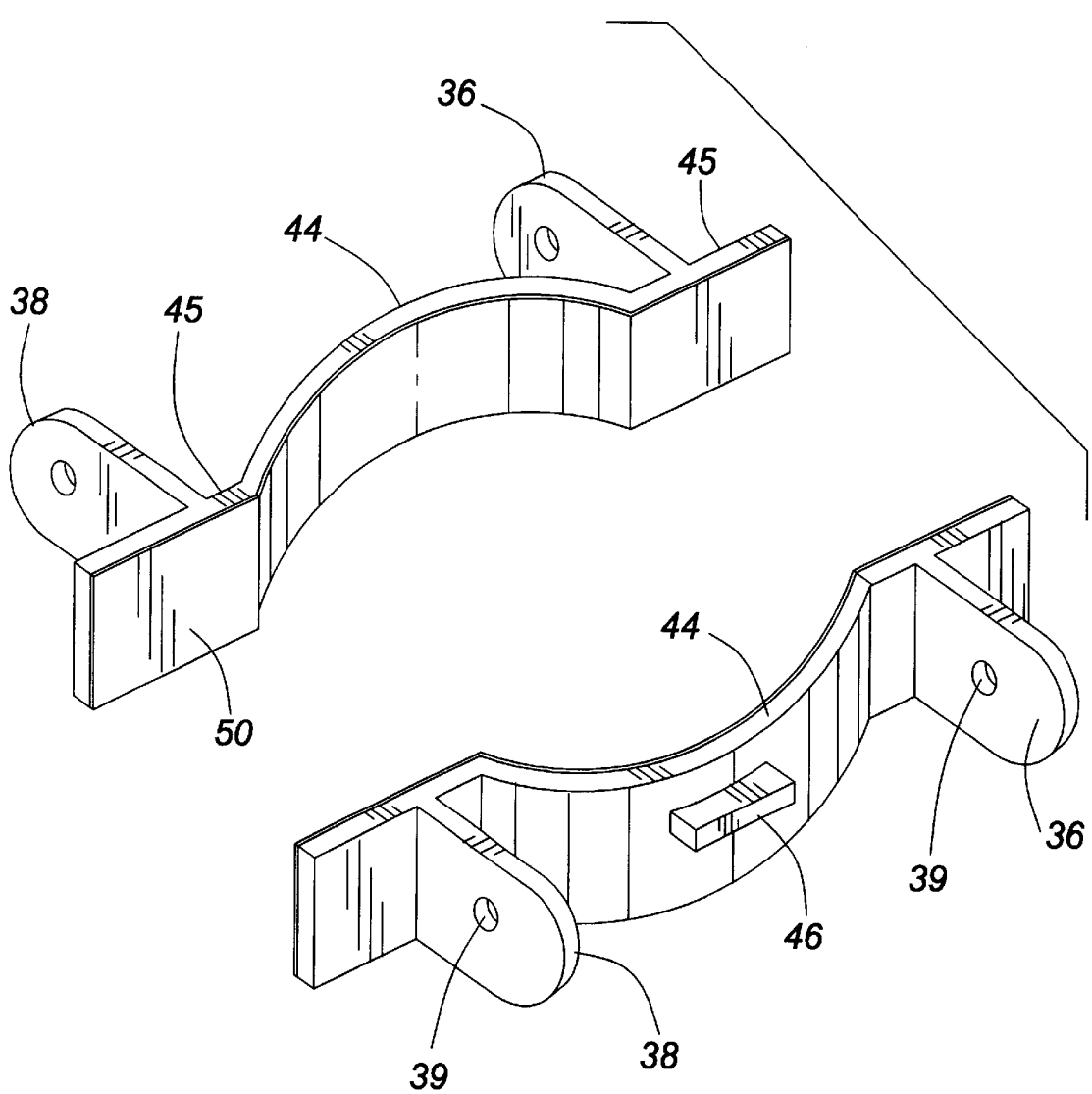
FIG. 3 shows the plate members in an operating orientation.

As best seen in FIG. 3, the gripping pads include rearward-facing webs 36, 38 each having opening 39 through which a connecting member such as a pin or bolt is inserted for pivotal attachment to the fork members 40, 42. In this manner, the gripping pads 32, 34 will self align in relation to the object to be lifted thereby accommodating objects of varying shapes and dimensions. Additionally, the central portion of each gripping pad includes a rearwardly projecting arcuate section 44 that serves to improve the distribution of gripping forces when the gripping pads are used to raise a circular/cylindrical object. The flat sections 45 at each end of the gripping pads provide cooperating surfaces for gripping square or rectangular objects. Again it will be apparent that the size and shape of the arcuate section may be configured in order to accommodate a particular object. Of course, the gripping pads can be supplied without any arcuate section at all. In view of the manner in which the gripping pads are conveniently attached to the forks it will be obvious that differently configured gripping pads can be provided and changed at the job site in order to best suit a particular application. Also shown in FIG. 3 is toe pad 46 which may be provided on the rear face of one or both gripping pads 32, 34. The toe pads 46 are placed on the gripping pads so that operators may use their feet to "snug up" or position the gripping pads to an object to be lifted while keeping their hands clear of the device.

In a further embodiment of the invention, the gripping pads are faced with a rubberized material 50 which may be, for example, a one-quarter inch thick ultraviolet and chemical resistant, 60 durometer neoprene which is bonded to the plates with a high strength, two-stage polymer adhesive.

The frame members in one embodiment are manufactured from materials such as welded 1¼" square ⅛" thick wall structural steel, and the fasteners may be high-grade galvanized nuts and bolts.

When the device is used as a manual or hand tool and used by two operators, it can conveniently handle objects in the 18" to 26" range. When used with hoist, loader or excavators using hooks and cables, the device can accommodate objects in the 16" to the 30" range. The device manufactured from the above materials weighs less than 40 lbs and has a load capacity of 770 lbs (350 kg.) and complies with all applicable OSHA (Occupational Safety & Health Administration) regulations. It will be apparent that other materials can be used in the device manufacture if a greater load capacity is required. It will also be apparent that the size range of objects to be lifted is representative only and not in any way intended to be a limiting factor.

Although a particular embodiment of the invention has been described and illustrated, it will be apparent to one skilled in the art that numerous changes can be made to the basic concept. It is to be understood, however, that such changes will fall within the true scope of the invention as defined by the appended claims.

What is claimed is:

1. A lifting device comprising:

a pair of elongate arms of substantially equal length pivotally connected to provide a pair of upper portions and a pair of lower portions;

a handle located on an upper end of each upper portion, said handles for use in raising said lifting device; and a gripping plate on a lower end of each lower portion for gripping an object to be lifted, each gripping plate having a straight portion at each end and a central arcuate portion, such that when said lifting device is in a lifting operation, said end portions of said gripping plates are in a parallel relationship and said central arcuate portions curve rearwardly;

wherein an upward force on said upper portions causes said gripping plates to be forced towards each other thereby damping said object to be lifted.

2. A lifting device as defined in claim 1 wherein at least one of said upper portions is provided with an eye for receiving a hook associated with a mechanical lifting means.

3. A lifting device as claimed in claim 1 wherein each handle includes handle members for use by a user on opposite sides of the device, said handle members being at an angle relative to said upper portions so as to be in a substantially horizontal orientation when said lifting device is in a lifting operation.

4. A lifting device as defined in claim 1 wherein said gripping plate is pivotally connected to said lower end of each lower portion by pivoting means connected to fork members on each lower end.

5. A lifting device as defined in claim 4 wherein said gripping plates are removeably attached to said fork members.

6. A lifting device as defined in claim 1 wherein facing portions of said gripping plates have a rubberized surface.

7. A lifting device as defined in claim 1 wherein a toe plate is attached to a rear face of at least one of said gripping plates.

8. A method of lifting heavy objects comprising:

providing a lifting device having a pair of elongated arm members pivotally connected to form a pair of spaced upper ends and a pair of cooperating lower ends, each upper end having raising means and each of said lower ends having complementary gripping plates, each of said gripping plates having a straight portion at each end and a central arcuate portion such that when said lifting device is in a lifting operation, respective end portions of said gripping plates are in a parallel relationship and said central arcuate portions curve rearwardly;

placing said lifting device over said object such that said gripping plates lie on opposite sides of said object; and applying upward movement to said raising means thereby clamping said gripping means to said object and lifting said object.

9. The method as defined in claim 8 wherein said upward force is applied by a pair of users each grasping handle means on the upper ends of elongate arms.

10. The method as defined in claim 8 wherein said upward force is applied by a mechanical device having means to hook onto said raising means on upper ends of said elongate arm members.

11. A method as defined in claim 8 including providing a toe pad on a rear face of at least one of said gripping plates to allow a user of said device to use a foot to position said gripping plate in contact with said object.

* * * * *